United States Patent [19]

Ojima

[11] Patent Number: 5,033,992
[45] Date of Patent: Jul. 23, 1991

[54] BELT OR CHAIN TENSIONER FOR POWER TRANSMITTING SYSTEM

[75] Inventor: Juji Ojima, Aikawa, Japan

[73] Assignee: NHK Spring Co. Ltd., Yokohama, Japan

[21] Appl. No.: 545,503

[22] Filed: Jun. 29, 1990

[30] Foreign Application Priority Data

Jul. 7, 1989 [JP] Japan .................. 01-176417

[51] Int. Cl.⁵ .................. F16H 7/08
[52] U.S. Cl. .................. 474/111; 474/138
[58] Field of Search .................. 474/101, 109–111, 474/113–117, 133, 135, 136, 138

[56] References Cited

U.S. PATENT DOCUMENTS 4,702,726 10/1987 Ojima et al. .................. 474/138 X
4,722,720 2/1988 Ojima et al. .................. 474/138 X
4,934,984 6/1990 Ojima et al. .................. 474/111

Primary Examiner—Thuy M. Bui
Attorney, Agent, or Firm—Fleit, Jacobson, Cohn, Price, Holman & Stern

[57] ABSTRACT

A belt or chain tensioner provided with a detachable holder for locking an urging tension rod during storage and transport and a slipproof cap provided on the end of the tension rod for abutting against the holder.

6 Claims, 4 Drawing Sheets

_5,033,992_

BELT OR CHAIN TENSIONER FOR POWER TRANSMITTING SYSTEM

BACKGROUND OF THE INVENTION

The present invention relates to a tensioner for applying a constant tension on a timing chain or belt driving a camshaft of a motorcycle or automobile.

A belt or chain tensioner is used to maintain a constant tension on the belt or chain by tensioning in predetermined direction when the belt or chain is slackened by elongation or wear during operation.

A conventional belt tensioner was disclosed by the Japanese Utility Model Application Laid-open No. 62-19015 as shown in the FIG. 10. The conventional belt tensioner principally comprises a cylindrical casing 1 to be fixed on equipment by means of holes formed on a the wing portion thereof, a rotational cylinder 2 rotatably inserted in the casing 1, a tension rod 3 urged by the rotating operation of the rotational cylinder 2 engaged with male threads formed on the front portion of the rotational cylinder 2, a torsion spring 4 for driving the rotational cylinder 2 and a bearing 5 for supporting the tension rod 3 and at the same time for restricting rotational movement of the tension rod 3 by means of a non circular bearing.

When the tension rod 3, wherein a rotational energy of torsion spring is stored by turning the rotational cylinder 2, abuts on a belt or chain, the tensions the rod 3 tenses belt or chain by an urging force converted from rotational energy of the torsion spring 4. That is, since the rotation of the tension rod 3 is restricted by the bearing 5, the rotational energy of rotational cylinder 2 is converted into an urging energy for tensioning the belt or chain. In this manner, the chain or belt can be tensioned without excessive play, but constant tension.

In FIG. 10, numeral 7 shows a seal bolt screwed in the rear end of casing 1 and numeral 6 shows a boot covering the tension rod 3 and the front end of casing 1.

In this case, the tension rod 3 has to be locked during mounting on equipment or transport. Accordingly, a holder 10' of which lower ends are inserted in the neck of casing 1' is used for. The holder 10 locks the outward movement of tension rod 3 by holding tension head 3a.

The tension head 3a of the tension rod 3 is of flat head. However, when the tensioner is used for tensioning directly or indirectly on the belt or chain, it is possible that the flat head 3 interferes the endless movement of the belt or chain. Therefore, the flat head 3a of tension rod 3 is rounded commonly. However, if it is planned to use such holder as shown in FIG. 10, there may occur a problem that the holder 10 slips off from the rounded head of tension rod 3 releasing the tension rod 3.

Then, the object of the present invention is to provide such tensioner that the rounded head of the tension rod may be locked firmly.

SUMMARY OF THE INVENTION

A belt or chain tensioner according to the present invention has a rotational cylinder inserted in a torsion spring so as to rotate and to engage with a tension rod of which rotation is restricted by a bearing sliding in a slot of a casing. The rotational force of said rotational cylinder is converted in to an urging force for said tension rod in an axial direction characterized by comprising a holder for locking the axial movement of the tension rod detachably mounted in the casing. The tension rod is provided with a slipproof means on the head of the tension rod with which the holder engages and the urging movement of tension rod is locked firmly.

DESCRIPTION OF PREFERRED EMBODIMENTS

Figure 1:
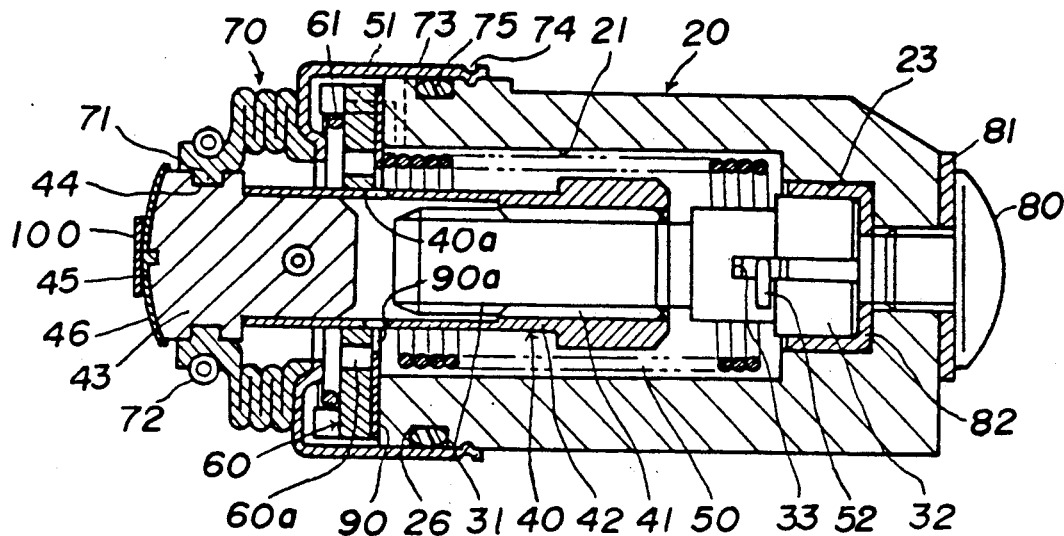
FIG. 1 shows an sectional view of a embodiment of a tensioner according to the present invention.

The integral construction of an embodiment according to the present invention will be explained referring to FIG. 1, 2 and 3. The tensioner comprises a casing 20 with a housing 21 formed axially, a rotational cylinder 30 and a tension rod 40 mutually engaged and inserted in the housing 21, a torsion spring 50 for driving the rotational cylinder 30, a bearing 60 mounted in the front portion of a casing 20 for supporting and restricting the rotation of tension rod 40 and a flexible boot 70 for covering the space between the front end of casing 20 and a tension head 43 of the tension rod 40.

The tension rod 40 advances itself by means of rotation of the rotational cylinder 30, of which top is rounded so as to have smooth contact on such external equipment such as a belt or chain. The tension rod 40 is urged by the energy stored in the torsion spring 50 through rotational cylinder 30. A holder 100 is used to prevent unnecessary advance of tension rod 40 when the tensioner is not in use.

Figure 2:
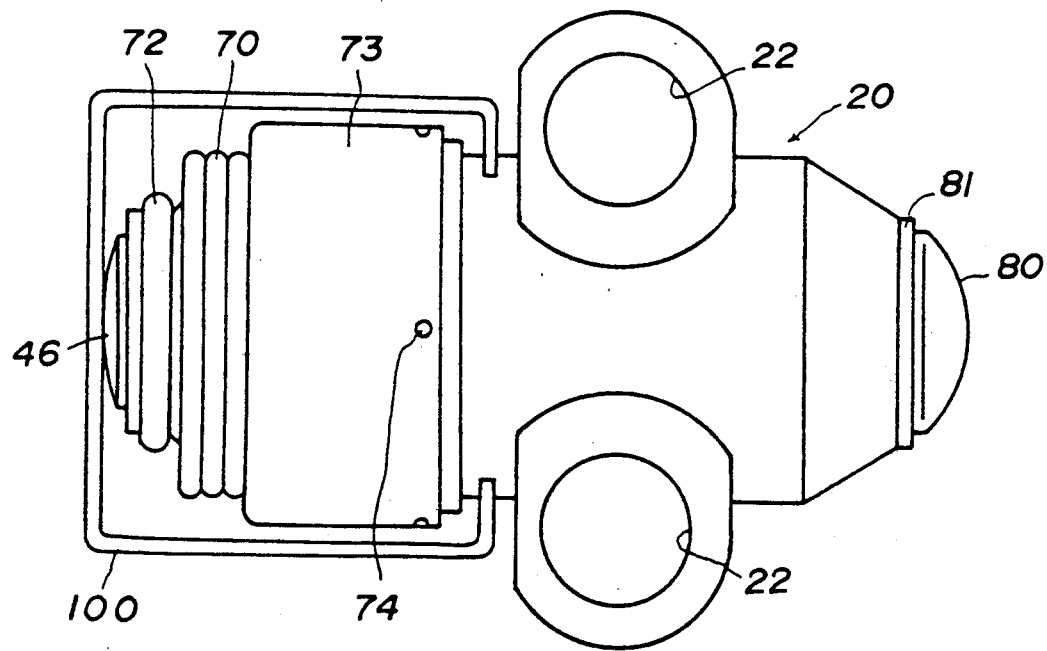
FIG. 2 shows a plane view.
Figure 3:
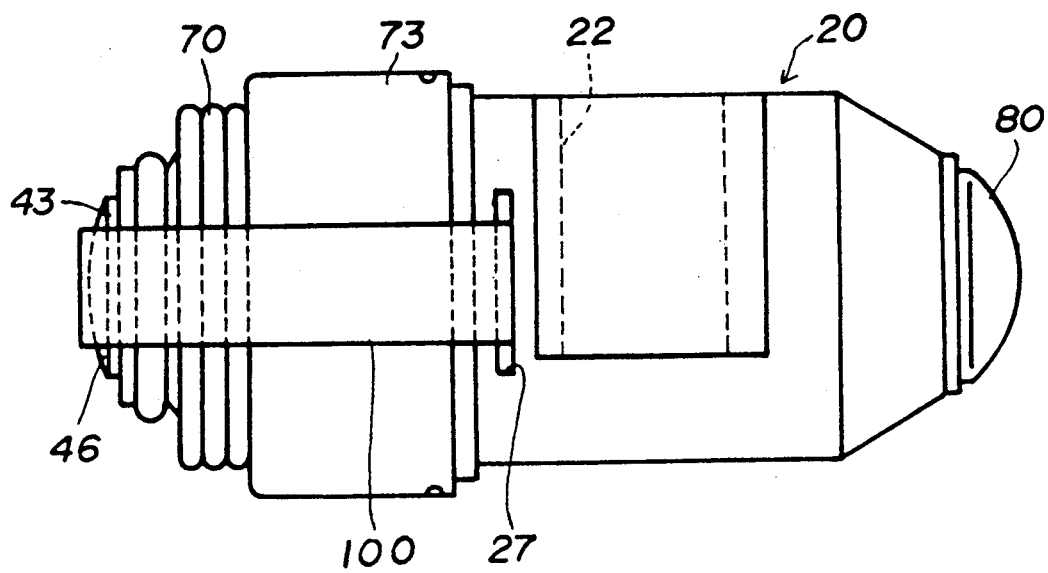
FIG. 3 indicates is a lateral view.

As shown in FIG. 2 and FIG. 3, the holder 100 is made of metal strap folded in square form, of which the ends are bent and inserted in to the grooves formed on the casing 20 and by which the advance of tension rod 40 is locked. After mounting the tension on an item of equipment, the holder 100 is taken off by extracting the ends of the holder from the casing 20 so as to make the tensioner work. A slipproof means is provided on the top 45 of tension head 43 which the holder 100 abuts on.

The tension rod 40 has the tension head 43 and a cylinder portion 42 mounted on the rear end of tension head 43. A slipproof seat is mounted on the top of tension head 43 which is rounded so as to tension a belt or chain, therefore the tension head 43 is slippery for the holder 100. In order to prevent slipping, a slipproof means is provided. According to the present embodiment, the seat has a cap 46 detachably fitting in a hollow formed on the top of tension head 43. The cap 46 is made of elastic material of high frictional coefficient, such as rubber or synthetic resin so that the seat protects the holder 100 from slipping. Accordingly the holder 100 is kept stably on the top of the tension head 43 locking an urging motion of the tension rod 40.

Figure 7:
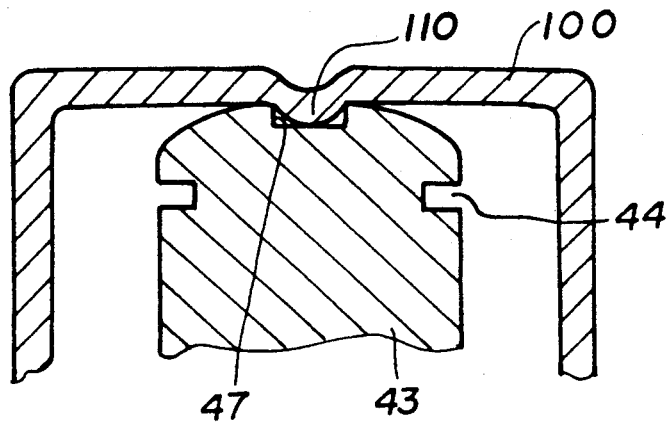
FIGS. 7, 8A-8B and 9 show sectional views of other embodiments of holder.
Figure 8A:
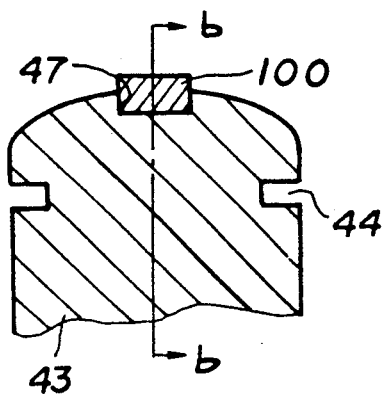
Figure 8B:
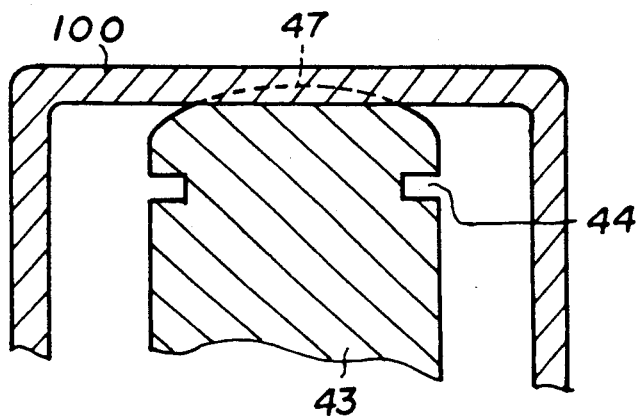
Figure 9:
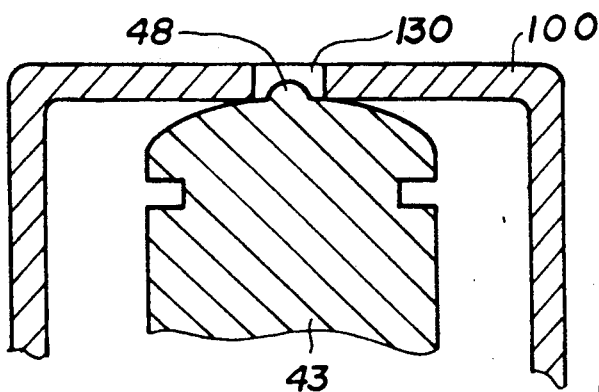
Figure 10:
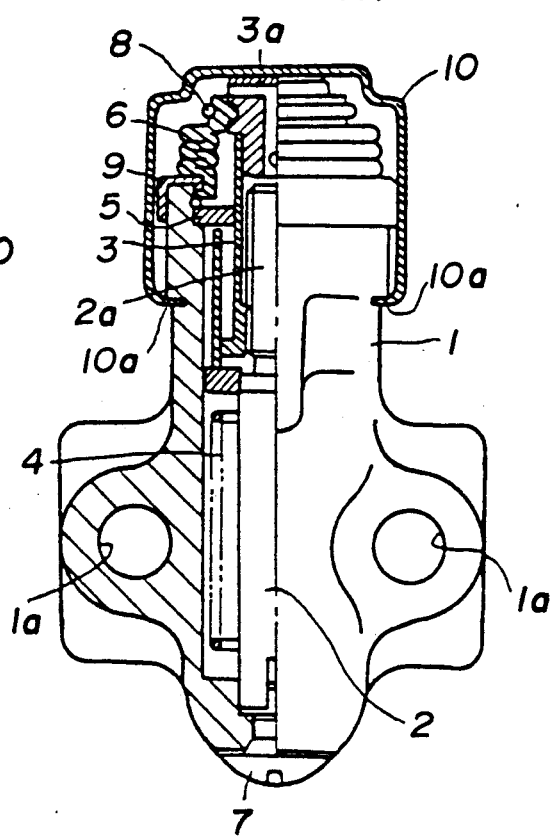
FIG. 10 shows a sectional view of conventional a tensioner.

FIGS. 7 to 9 show various embodiments of slipproof means. As shown in FIG. 7, a hollow portion 47 is formed on the top of tension head 43 so that the holder 100 fits in. A salient point is formed on the holder 100 itself so as to fit in a hollow portion 47 of tension head 43. As shown in the FIG. 8 (a) and (b), the hollow portion 47 is wider than that of holder 100 and parallel to the holder passing 100 the center of tension head so that the whole holder may fit in the hollow portion 47.

According to the another embodiment shown in FIG. 9, a small protrusion 48 is formed on the top of tension head 43, which is fit in a slot 130 formed on the holder 100 so as to get slipproof seat.

The slipproof means is defined not only by the embodiments aforementioned, but other adequate grooves or knurled portions formed on the tension head 43. Having this type of slipproof means, the advance movement of tension rod 40 can be locked during storage and transport.

Hereinafter, various elements according to the present invention will be described. As shown in the FIG. 1, a casing 20 has wing portions having through holes 22 for fixing on an item of equipment, not shown. A seal bolt 80 is screwed into the rear end of casing with a packing 81. A rotational cylinder 30 has a male threaded cylinder portion 31 and a cylinder portion 32, of which male threaded portion 31 is engaged with inner threaded portion of tension rod 40 so as to transmit rotational energy. The cylinder portion 32 is supported by a cup shaped bushing 82 inserted into a bearing seat of the casing 20. On the cylinder portion 32, an axial slit 33 is formed so as to receive a hook 52 of torsion spring 50.

The tension rod 40 comprises a cylinder portion 42 with an inner female threaded portion 41 and a tension head 43 inserted in the front portion of cylinder portion 41, wherein the male threaded portion 31 of the rotational cylinder 31 is screwed in to the female threaded portion 41 of the cylinder portion 42 of tension rod 40. The rotational energy of rotational cylinder 30 is transmitted to the tension rod 40, but the rotational energy is converted in urging energy by means of the bearing 60 inserted in slots formed on the inner wall of casing, then urging the tension head 43 outward so as to abut on a belt, chain or roller for tensioning the belt or chain directly or indirectly. In this manner, an adequate tension is maintained.

A torsion spring 50 is externally inserted over the tension rod 40 and the rotational cylinder 30, resulting in three layered construction, whereby a long stroke can be obtained even though the external dimension of the tensioner is apparently short. The front hook 51 of torsion spring 50 is inserted in a bearing 60 and the rear hook 52 of torsion spring 50 is inserted in the slit 33 of rotational cylinder 30. Then turning the rotational cylinder 30, rotational energy is stored in the torsion spring 50. The end of rear hook is bent when inserted in the slit 33, whereby the radial variation of torsion spring 50 is prevented during operation resulting in stable operation.

Figure 4:
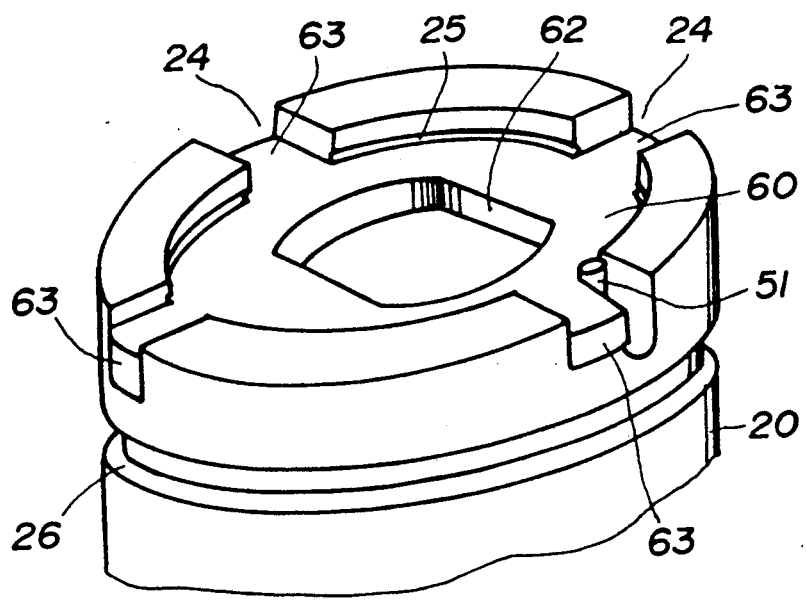
FIG. 4 and FIG. 5 show a perspective view and sectional view showing the fixing structure of a bearing respectively.
Figure 5:
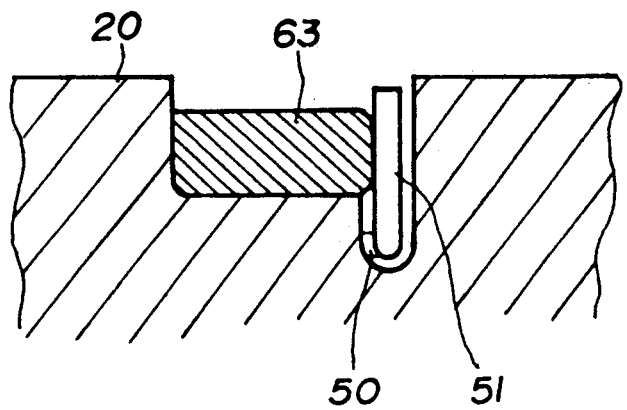
Figure 6:
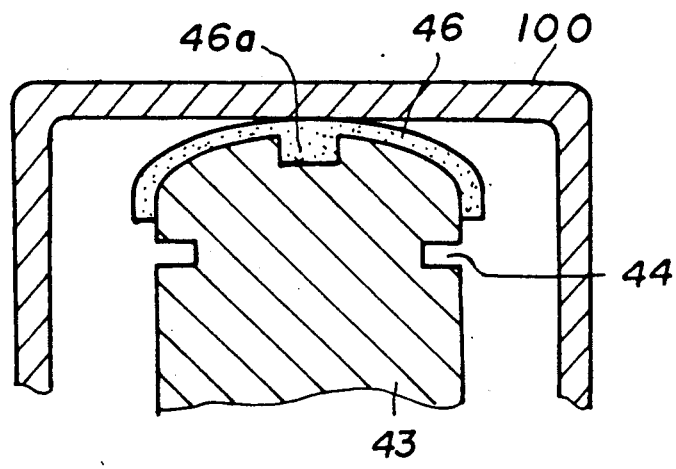
FIG. 6 shows a sectional view of an embodiment of a holder.

The bearing 60 is fixed on the front end of casing with a snap ring 61 so as to restrict rotation of tension rod 40. Its fixing system is shown in FIG. 4 and FIG. 5. A slot 62 is formed in the center of bearing 60 with four ears 63 at angular distances of 90° in which the cylinder portion 42 of tension rod 40 is inserted so as to restrict a rotational movement of tension rod 40. The four ears 63 of bearing 60 are inserted in four mating slits 24 formed on the wall of front portion of casing 20 at an angular distance of 90° so that rotation of the bearing is restricted. In this case the depth of said slits is larger than the length of said ears 63 and the bearing 60 is fixed with a snap ring 61 inserted in an inner ring groove 25 formed on the front portion of casing.

Further a spacer 90 is inserted between the bearing 60 and casing 20 including radially front and rear ends of ears 63 so that the pressure applied on the casing 20 by the rotational energy of rotational cylinder 30 may be alleviated by receiving with wider surfaces of bent portions of said ears 63. Wear of ears 63 and radial end surfaces of casing 20 can be prevented. In addition, having protection by using the spacer 90 for bearing and bushing 82, the casing 20 can be made of less resistent material against wear such as aluminium and synthetic resins still permitting the reduction of weight and perfect operation. The end of front hook 51 of torsion spring 50 is inserted in a slit 24 so as to be fixed.

A boot 70 covers the space between the tension head 43 and the casing 20. An inner "O" ring portion 71 is formed on the front end of boot 70 and is fitted in a ring groove 44 formed on the outer surface of tension head 43. By securing the boot on the tension head with a snap ring 72, the gap between the tension head 43 and boot 70 can be sealed hermetically. The rear end of boot 70 is glued or welded on a cover 73 fixed on the casing 20. The rear end of cover 73 made of hard material has an inner diameter almost even to the outer diameter of the casing 20 and caulked as indicated with numeral 74 on the casing 20. The front end of cover 73 is folded inward. An outer ring groove 26 is formed on the covered portion of casing 20 73 and an "O" ring 75 is fitted in the groove 26. The "O" ring 75 made of elastic material seals the gap between the outer surface of casing 20 and the inner surface of cover 73 hermetically. Accordingly the possible penetration of dust and leakage of lubrificant can bve prevented. Then it is not necessary to press the cover 73 on the casing so as to hermetically seal it, also dispensing dimensional accuracy in fabrication and improoving productivity.

In the FIG. 1, numerals 40a, 60a and 90a indicate the passage for lubricant formed on the tension rod 40, bearing 60 and spacer 90 respectively, wherein lubrificant can be applied evenly.

Having construction aforementioned, the slipproof means provided on the top of tension head abuts on the holder and the slipping of holder can be prevented by the friction or engagement between the slipproof means and holder.

What is claimed is:

1. A belt or chain tensioner for a power transmitting system having a casing containing a rotational cylinder inserted in a torsion spring, a tension rod engaged with the cylinder a bearing fixed in the casing for restricting rotation of the tension rod, whereby the rotational force of said rotational cylinder can be converted into an axial urging force for said tension rod characterized by comprising;
   a holding means detachably mounted on said casing for arresting axial movement of the tension rod by abutting an end of said tension rod; and
   a slipproof means provided on said end of said tension rod so as to abut on said holding means.

2. Said tensioner according to claim (1) characterized by said slipproof means comprising a cap of high frictional coefficient mounted on the tension rod.

3. Said tensioner according to claim (1) characterized by said slipproof means comprising a groove formed in the end of the tension rod in parallel with said holding means so as to engage with said holding means.

4. Said tensioner according to claim (1) characterized by the holding means comprising a holder with a projection for engaging with a slot formed in the end of the tension rod.

5. Said tensioner according to claim (1) characterized by the holding means comprising a holder with a slot for engaging with a projection formed on the end of the tension rod.

6. Said tensioner according to claim (1) characterized by the holding means comprising a holder made of strap type material.

* * * * *